(12) United States Patent     (10) Patent No.: US 8,900,536 B2
Augustine et al.     (45) Date of Patent: Dec. 2, 2014

(54) CATALYST SUPPORT MATERIALS, CATALYSTS, METHODS OF MAKING THEM AND USES THEREOF

(71) Applicant: Cristal USA Inc., Hunt Valley, MD (US)

(72) Inventors: Steve M. Augustine, Ellicott City, MD (US); David M. Chapman, Ellicott City, MD (US); Dennis F. Clark, Catonsville, MD (US)

(73) Assignee: Cristal USA Inc., Hunt Valley, MD (US)

( * ) Notice: Subject to any disclaimer, the term of this patent is extended or adjusted under 35 U.S.C. 154(b) by 0 days.

(21) Appl. No.: 13/975,073

(22) Filed: Aug. 23, 2013

(65) Prior Publication Data

US 2014/0056793 A1     Feb. 27, 2014

Related U.S. Application Data

(60) Provisional application No. 61/693,245, filed on Aug. 24, 2012, provisional application No. 61/695,541, filed on Aug. 31, 2012.

(51) Int. Cl.
*B01D 53/56*     (2006.01)
*B01D 53/86*     (2006.01)
(Continued)

(52) U.S. Cl.
CPC .............. *B01J 27/199* (2013.01); *B01J 23/28* (2013.01); *B01D 53/565* (2013.01); *B01J 21/063* (2013.01); *B01J 27/051* (2013.01); *B01J 27/19* (2013.01); *B01J 35/1014* (2013.01); *B01J 37/0201* (2013.01); *B01J 2523/00* (2013.01)
USPC .......... 423/239.1; 502/11; 502/209; 502/211; 502/214; 502/242; 502/248; 502/255; 502/350; 502/439

(58) Field of Classification Search
CPC .......... B01J 23/22; B01J 23/28; B01J 21/063; B01J 27/182; B01J 27/19; B01J 27/199; B01D 53/565

USPC .......... 502/11, 209, 211, 214, 242, 248, 255, 502/350, 439; 423/239.1
See application file for complete search history.

(56) References Cited

U.S. PATENT DOCUMENTS 4,221,768 A     9/1980 Inoue et al.
4,280,989 A     7/1981 Seimiya et al.
(Continued)

FOREIGN PATENT DOCUMENTS

EP     0225062 B1     6/1987
EP     0472358 B1     1/1996
(Continued)

OTHER PUBLICATIONS

International Search Report and Written Opinion mailed Jan. 10, 2014, which issued in corresponding International Application No. PCT/US2013/056505.

(Continued)

*Primary Examiner* — Cam N. Nguyen
(74) *Attorney, Agent, or Firm* — Greenberg Traurig LLP; Jonathan D. Ball; Alina Khankin

(57) ABSTRACT

Catalyst support materials, catalysts, methods of making such and uses thereof are described. Methods of making catalyst support material include combining anatase titania slurry with i) a low molecular weight form of silica; and ii) a source of Mo to form a $TiO_2$—$MoO_3$—$SiO_2$ mixture. Catalyst support material include from about 86% to about 94% weight anatase titanium dioxide; from about 0.1% to about 10% weight $MoO_3$; and from about 0.1% to about 10% weight $SiO_2$. Low molecular weight forms of silica include forms of silica having a volume weighted median size of less than 4 nm and average molecular weight of less than 44,000, either individually or in a combination of two or more thereof. Catalyst include such catalyst support material with from about 0.1 to about 3% weight of $V_2O_5$ and optionally from about 0.01% to about 2.5% weight P.

8 Claims, 4 Drawing Sheets

(51) Int. Cl.

| | |
|---|---|
| *B01J 8/00* | (2006.01) |
| *C01B 21/00* | (2006.01) |
| *B01J 37/30* | (2006.01) |
| *B01J 27/198* | (2006.01) |
| *B01J 27/19* | (2006.01) |
| *B01J 27/182* | (2006.01) |
| *B01J 21/00* | (2006.01) |
| *B01J 21/04* | (2006.01) |
| *B01J 23/02* | (2006.01) |
| *B01J 27/199* | (2006.01) |
| *B01J 23/28* | (2006.01) |
| *B01J 21/06* | (2006.01) |
| *B01J 27/051* | (2006.01) |
| *B01J 35/10* | (2006.01) |
| *B01J 37/02* | (2006.01) |

(56) References Cited

U.S. PATENT DOCUMENTS

| | | | |
|---|---|---|---|
| 4,409,339 A | 10/1983 | Matsuda et al. | |
| 4,510,073 A | 4/1985 | Hara et al. | |
| 4,725,572 A | 2/1988 | Sera et al. | |
| 4,859,439 A | 8/1989 | Rikimaru et al. | |
| 4,929,586 A | 5/1990 | Hegedus et al. | |
| 5,085,840 A | 2/1992 | Held et al. | |
| 5,087,430 A | 2/1992 | Hanada et al. | |
| 5,128,060 A | 7/1992 | Ueno et al. | |
| 5,198,403 A | 3/1993 | Brand et al. | |
| 5,204,387 A | 4/1993 | Matsuzaki et al. | |
| 5,516,497 A | 5/1996 | Speronello et al. | |
| 5,550,096 A | 8/1996 | Inoue et al. | |
| 5,580,533 A | 12/1996 | Kivioja et al. | |
| 5,582,809 A | 12/1996 | Rikimaru et al. | |
| 5,723,404 A | 3/1998 | Butje et al. | |
| 5,837,635 A | 11/1998 | Kischkewitz et al. | |
| 5,877,330 A | 3/1999 | Kishimoto et al. | |
| 6,641,785 B1 | 11/2003 | Neufert et al. | |
| 6,956,006 B1 | 10/2005 | Mirsky et al. | |
| 7,175,821 B2 | 2/2007 | Flynn et al. | |
| 7,829,062 B2 | 11/2010 | Lai et al. | |
| 8,173,098 B2 * | 5/2012 | Morita et al. | 423/610 |
| 8,435,915 B2 * | 5/2013 | Prochazka et al. | 502/208 |
| 8,716,172 B2 * | 5/2014 | Schermanz et al. | 502/312 |
| 2001/0004452 A1 * | 6/2001 | Mathes et al. | 423/213.2 |
| 2003/0103889 A1 | 6/2003 | Mirsky et al. | |
| 2003/0104932 A1 | 6/2003 | Kim | |
| 2004/0180783 A1 | 9/2004 | Nomima et al. | |
| 2005/0106095 A1 | 5/2005 | Manorama et al. | |
| 2005/0137082 A1 | 6/2005 | Nojima et al. | |
| 2006/0084569 A1 | 4/2006 | Augustine et al. | |
| 2007/0129241 A1 | 6/2007 | Schermanz et al. | |
| 2007/0155622 A1 | 7/2007 | Goodwin et al. | |
| 2008/0234126 A1 | 9/2008 | Hong et al. | |
| 2009/0047424 A1 | 2/2009 | Momma | |
| 2010/0183492 A1 | 7/2010 | Kato et al. | |
| 2011/0027154 A1 | 2/2011 | Chapman | |
| 2011/0250114 A1 | 10/2011 | Augustine et al. | |
| 2011/0250127 A1 | 10/2011 | Fedeyko et al. | |

FOREIGN PATENT DOCUMENTS

| | | |
|---|---|---|
| JP | 59035027 | 2/1984 |
| JP | 59035028 | 2/1984 |
| JP | 2001-286734 | 10/2001 |
| JP | 2003093880 | 4/2003 |
| JP | 2005144299 A | 6/2005 |
| WO | 0220407 | 3/2002 |

OTHER PUBLICATIONS

Australian Innovation Application no. 2012100019, David M. Chapman, Innovation Patent Examination Report No. 3 (6 pages) Date of Issue Oct. 6, 2012).

Beeckman et al., "Design of Monolith Catalysts for Power Plant No Emission Control", Ind. Eng. Chem. Res., (1991), vol. 30, pp. 969-978.

Bosch et al., "Catalytic Reduction of Nitrogen Oxides: A Review of the Fundamentals and Technology", Catalysis Today, (1988) vol. 2, No. 4, Chapter 5.3: Vanadia-Containing Catalysts, pp. 460-479.

Canadian Application No. 2,765,273, Millennium Inorganic Chemicals, Inc., Office Action dated Apr. 17, 2013, 4 pages.

Elvers, Barbara et al. (Editors), Ullmanns' Encylcopedia of Industrial Chemistry, fifth, Completely Revised Edition, vol. A 23: Refractory Ceramics to Silicon Carbide, "Silica", SCM Chemicals Library 3901 Fort Armistead Road, Baltimore, MD 21226, Retrieved on Nov. 11, 1993, pp. 614-651.

Engelhardt G., et al., High-Resolution Solid-State NMR of Silicates and Zeolites "29S1 NMR of silicate solutions", (1987) pp. 75-103.

Grace Brochure, "Coatings Product Overview" W.R. Brace & Co., http://www.grace.com/EngineeredMaterials/ProductsAndApplications, (2006), pp. 1-2.

Iler R., The Chemistry of Silica, "The Silica-Water System," John Wiley & Sons, Inc., (1979), pp. 7-9.

Iler R., The Chemistry of Silica, Chapter 3 "Polymerization of Silica", John Wiley & Sons, Inc., (1979), pp. 172-289.

Iler R., The Chemistry of Silica, "The Silica-Water System," John Wiley & Sons, Inc., (1979), pp. 554-556.

International Search Report & Written Opinion dated Mar. 25, 2011, which issued in corresponding International Application No. PCT/IB2010/02236.

International Search Report and Written Opinion dated Jul. 1, 2011, which issued in corresponding International Application No. PCT/US2010/056485.

International Preliminary Report on Patentability dated Feb. 9, 2012, which issued in corresponding International Application No. PCT/IB2010/002236.

Ogbebor et al., "Physico-Mechanical Properties of Elastomers Based on Natural Rubber Filled with Silic and Clay" Association of the Chemical Engineers AchE—Chemical Industry & Chemical Engineering Quarterly CI&CEQ vol. 16, No. 4, pp. 373-378 (2010).

Solar et al., "Characterization of Denox Catalysts Supported on Titania/Silica", Catalysis Today, (1992), vol. 14, pp. 211-224.

Technical Bulletin Brochure, Fine Particules No. 11, Basic Characteristics of AEROSIL Fumed Silica, Degussa. Aerosil & Silanes, 3.2.1 Particle Size and Structure, pp. 21-23 (date unknown).

TiONA® DT-S10 Data Sheet, (May 21, 2007), 7 pages.

TiONA® DT-S58 Safety Data Sheet, (May 21, 2007), 7 pages.

Tokyuama Brochure, "Finesile®" Tokuyama: Product Information: Finesil, http://www.tokuyama.co.jp/eng/products/chem/si/finesil.htmp, pp. 1-2 (printed Sep. 17, 2012).

Written Opinion dated Feb. 9, 2012, which issued in corresponding International Application No. PCT/IB2010/002236.

* cited by examiner

Step 110

Providing anatase titania slurry

Step 120

Adjusting the pH of the anatase titania slurry

Step 130

Providing colloidal silica gel

Step 140

Adjusting pH of the anatase titania slurry

Step 150

Providing Tungsten

PRIOR ART

FIG. 3

Step 310

Combining TiO$_2$- MoO$_3$-SiO$_2$ mixture with V$_2$O$_5$ to form a vanadia catalyst.

Step 320

Calcining the vanadia catalyst around 600°C.

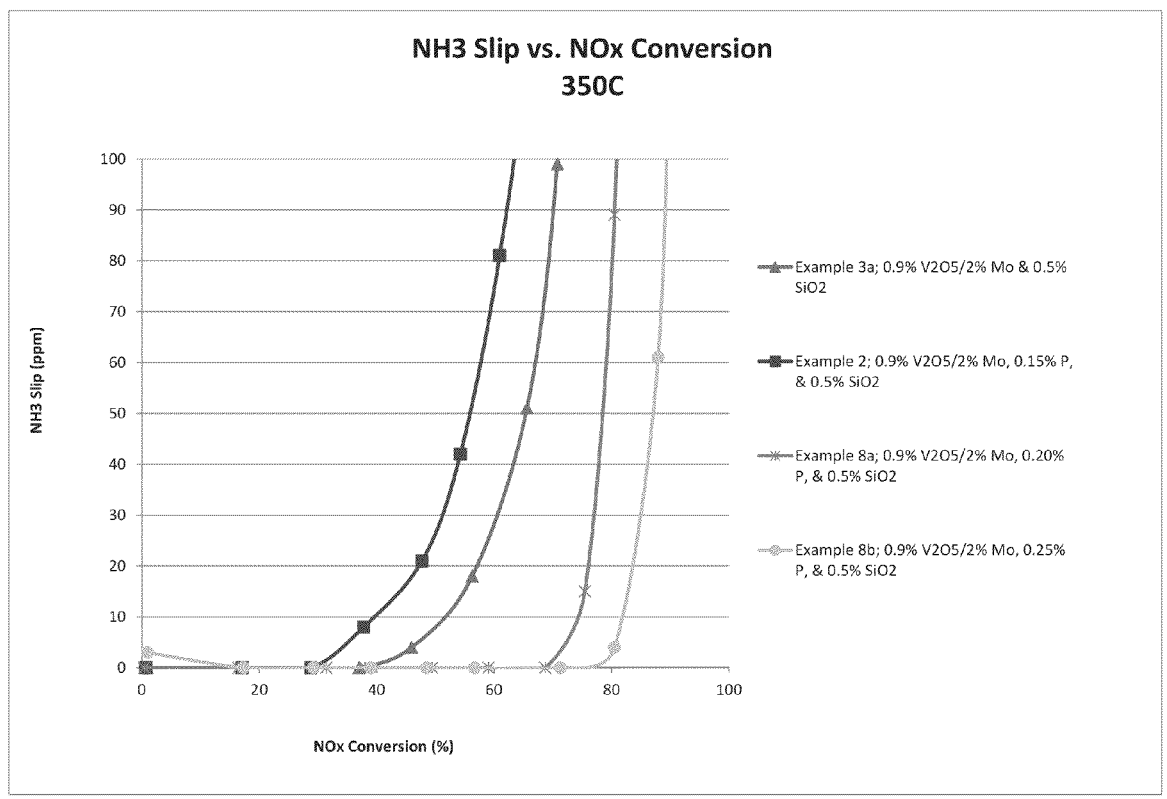

CATALYST SUPPORT MATERIALS, CATALYSTS, METHODS OF MAKING THEM AND USES THEREOF

This application claims priority under 35 U.S.C. §119(e) to U.S. Provisional application 61/693,245, filed on Aug. 24, 2012, and U.S. Provisional application 61/695,541, filed on Aug. 31, 2012, the entire contents of which are hereby incorporated by reference.

BACKGROUND

The entire contents of U.S. Ser. No. 12/533,414 filed Jul. 31, 2009 and entitled "Silica-Stabilized Ultrafine Anatase Titania, Vanadia Catalysts, and Methods of Production Thereof" is expressly incorporated herein by reference in its entirety as though set forth explicitly herein.

FIELD OF THE PRESENTLY DISCLOSED AND/OR CLAIMED INVENTIVE CONCEPT(S)

This invention includes embodiments relating to catalyst support materials and catalyst compositions and methods of making and using such catalyst support materials and catalysts. Particularly, the invention includes embodiments relating to compositions and methods of making catalyst support materials and catalysts for reducing nitrogen oxide content of a nitrogen oxide-containing gas or liquid in mobile and stationary applications.

Some processes for the removal of $NO_x$ formed in combustion exit gases are known in the art such as selective catalytic reduction (SCR) process. In this process, nitrogen oxides are reduced by ammonia (or another reducing agent such as unburned hydrocarbons present in the waste gas effluent) in the presence of oxygen and a catalyst to form nitrogen and water. The SCR process is used in the United States, Japan, and Europe to reduce emissions of large utility boilers and other commercial applications. Increasingly, SCR processes are being used to reduce emissions in mobile applications such as in large diesel engines like those found on ships, diesel locomotives, automobiles, and the like.

Some SCR catalysts with a metal oxide such as molybdenum, tungsten, vanadium, and iron for removing $NO_x$ are known. However, one or more limitations exist as discussed below. Tungsten-containing catalyst may be limited by price and availability. Molybdenum-containing catalyst systems are limited by the relatively higher volatility compared to tungsten counterparts and relatively higher $SO_2$ oxidation rate compared to tungsten-containing systems. $SO_2$ oxidation is a problem in stationary $DeNO_x$ applications due to the formation of ammonium sulfate which causes plugging and excessive pressure drop in process equipment.

Consequently, catalyst support materials and catalysts suitable for reducing the nitrogen oxide content of a nitrogen oxide-containing gas or liquid at various conditions are still needed. Also needed is a method of making such catalyst support materials and catalysts and method of reducing the nitrogen oxide content of a nitrogen oxide-containing gas or liquid in mobile and stationary applications.

BRIEF SUMMARY

Embodiments of the present invention meet these and other needs by providing $NO_x$ reducing catalysts, methods of making $NO_x$ reducing catalysts and methods of removing the nitrogen oxide content of a nitrogen oxide-containing liquid or gas with such $NO_x$ reducing catalysts.

Accordingly, one aspect of the invention provides a method of making a catalyst support material. The method includes: combining an anatase titania slurry with i) one or more low molecular weight forms of silica and ii) a source of Mo to form a $TiO_2$—$MoO_3$—$SiO_2$ mixture. The low molecular weight forms of silica include forms of silica having a volume weighted median size of less than 4 nm and average molecular weight of less than 44,000, either individually or in a combination of two or more thereof.

A second aspect of the invention provides a method of making a catalyst support material. The method includes: (a) providing anatase titania slurry; and (b) combining the anatase titania slurry with i) one or more low molecular weight forms of silica and ii) a source of Mo to form a $TiO_2$—$MoO_3$—$SiO_2$ mixture. The low molecular weight forms of silica include forms of silica having a volume weighted median size of less than 4 nm and average molecular weight of less than 44,000, either individually or in a combination of two or more thereof.

A third aspect of the invention provides a catalyst support material. The catalyst support material includes from about 86% to about 94% weight anatase titanium dioxide; from about 0.1% to about 10% weight $MoO_3$; and from about 0.1% to about 10% weight $SiO_2$ in low molecular weight forms. The low molecular weight forms of $SiO_2$ include forms of silica having a volume weighted median size of less than 4 nm and average molecular weight of less than 44,000, either individually or in a combination of two or more thereof.

A fourth aspect of the invention provides a method of making a catalyst support material. The method includes: combining an anatase titania slurry with i) volatility inhibitor comprising a low molecular weight form of the silica and ii) primary promoter comprising molybdenum oxide to form a $TiO_2$-Mb—$SiO_2$ mixture. The low molecular weight forms of silica include forms of silica having a volume weighted median size of less than 4 nm and average molecular weight of less than 44,000, either individually or in a combination of two or more thereof.

A fifth aspect of the invention provides a method of making a catalyst support material. The method includes: a) providing anatase titania slurry; and b) combining the anatase titania slurry with i) volatility inhibitor comprising a low molecular weight form of the silica and ii) primary promoter comprising molybdenum oxide to form a $TiO_2$-Mb—$SiO_2$ mixture. The low molecular weight forms of silica include forms of silica having a volume weighted median size of less than 4 mm and average molecular weight of less than 44,000, either individually or in a combination of two or more thereof.

A sixth aspect of the invention provides catalyst support material. The catalyst support material includes anatase titanium dioxide; a primary promoter comprising molybdenum oxide; and a volatility inhibitor comprising low molecular weight forms of silica. The low molecular weight forms of silica include forms of silica having a volume weighted median size of less than 4 nm and average molecular weight of less than 44,000, either individually or in a combination of two or more thereof.

A seventh aspect of the invention provides a method of reducing the nitrogen oxide content of a nitrogen oxide-containing liquid or gas. The method includes contacting the nitrogen oxide-containing gas or liquid with a catalyst for a time sufficient to reduce the level of $NO_x$ compounds in the gas or liquid. The catalyst includes: from about 86% to about 94% weight anatase titanium dioxide; from about 0.1% to about 10% weight $MOO_3$; from about 0.5% to about 3% weight $V_2O_5$; and from about 0.1% to about 10% weight $SiO_2$ in low molecular weight forms. The low molecular weight forms of silica include forms of silica having a volume weighted median size of less than 4 nm and average molecular weight of less than 44,000, either individually or in a combination of two or more thereof.

An eighth aspect of the invention provides another method of reducing the nitrogen oxide content of nitrogen oxide-containing liquid or gas. The method includes contacting the nitrogen oxide-containing gas or liquid with a catalyst for a time sufficient to reduce the level of $NO_x$ in the nitrogen oxide-containing gas or liquid wherein the catalyst is made by: combining an anatase titania slurry with i) one or more low molecular weight forms of silica and ii) a source of Mo, to form a $TiO_2$—$MoO_3$—$SiO_2$ mixture. The low molecular weight forms of silica include forms of silica having a volume weighted median size of less than 4 nm and average molecular weight of less than 44,000, either individually or in a combination of two or more thereof.

A ninth aspect of the invention provides a catalyst support material. The catalyst support material comprises a general formula of $TiO_2$—$MoO_3$—$SiO_2$, wherein the titanium dioxide is substantially in an anatase form and the silicon oxide has a volume weighted median size less than 4 nm and an average molecular weight of less than 44,000.

The accompanying figures, which are incorporated in and constitute a part of this specification, are included to illustrate and provide a further understanding of the methods and systems of the invention. Together with the description, the figures serve to explain the principles of the invention. It is contemplated that features from one embodiment may be beneficially incorporated in other embodiments without further recitation.

BRIEF DESCRIPTION OF THE DRAWINGS

FIG. 3 is a flow chart of a method of making catalysts in accordance with an embodiment of the invention; and FIG. 4 is a graphical comparative representation of catalyst performances of $NH_3$ slip vs. $NO_x$ conversion in accordance with an embodiment of the invention.

To facilitate understanding, identical reference numerals have been used, wherever possible, to designate identical elements that are common to the figures.

DETAILED DESCRIPTION

Figure 1:
FIG. 1 is a flow chart of a conventional method of making catalyst support material.
Figure 1:
Figure 1:
Figure 1:

In the following description, it is understood that terms such as "top," "bottom," "outward," "inward," and the like are words of convenience and are not to be construed as limiting terms. Reference will now be made in detail to exemplary embodiments of the invention, which are illustrated in the accompanying figures and examples. Referring to the drawings in general, it will be understood that the illustrations are for the purpose of describing a particular embodiment of the invention and are not intended to limit the invention thereto.

Whenever a particular embodiment of the invention is said to comprise or consist of at least one element of a group and combinations thereof, it is understood that the embodiment may comprise or consist of any of the elements of the group, either individually or in combination with any of the other elements of that group. Furthermore, when any variable occurs more than one time in any constituent or in formula, its definition on each occurrence is independent of its definition at every other occurrence. Also, combinations of substituents and/or variables are permissible only if such combinations result in stable compounds.

DEFINITIONS

All terms used herein are intended to have their ordinary meaning unless otherwise provided.

The terms "catalyst support," "support particles," or "support material" are intended to have their standard meaning in the art.

The terms "active metal catalyst" or "active component" refer to the catalytic component deposited on the surface of the support material presumed to catalyze the reduction of $NO_x$ compounds.

The terms "catalyst" and "catalytic composition" are intended to have their standard meaning in the art and refer to the combination of the supported catalyst components and the titania-based catalyst support particles.

Unless otherwise specified, all reference to percentage (%) herein refers to percent by weight. The terms "percent" and "loading" refer to the loading of a particular component on the total catalytic composition. For example, the loading of vanadium oxide on a catalyst is the ratio of the vanadium oxide weight to the total weight of the catalyst, including the titania-based support material, the vanadium oxide and any other supported metal oxides. Similarly, the loading in mole percent refers to the ratio of the number of moles of a particular component loaded to the number of moles in the total catalytic composition.

The term "phosphate" is used to refer to any compound containing phosphorus bound to oxygen.

An embodiment of the invention includes a method of making a catalyst support material. The method includes combining an anatase titania slurry with i) one or more low molecular weight forms of silica and ii) a source of Mo to form a $TiO_2$—$MoO_3$—$SiO_2$ mixture. The low molecular weight forms of silica include forms of silica having a volume weighted median size of less than 4 nm and average molecular weight of less than 44,000, either individually or in a combination of two or more thereof.

An embodiment of the invention includes a catalyst support material comprising from about 86% to about 94% weight titanium dioxide; from about 0.1% to about 10% $MOO_3$ and from about 0.1% to about 10% weight $SiO_2$. $SiO_2$ includes one or more low molecular weight forms of silica having a volume weighted median size of less than 4 mm and average molecular weight of less than 44,000, either individually or in a combination of two or more thereof.

For illustration and not limitation, an embodiment of the invention for methods of making catalyst support material is compared to conventional methods. As depicted in FIG. 1, a conventional method of making catalyst support material includes Step 110 providing anatase titania slurry. Step 120 includes adjusting pH. Step 130 includes providing all or substantially all silica as commercially available preformed silica particle such as colloidal, fumed, etc. Step 140 includes adjusting pH. Step 150 includes providing tungsten.

Figure 2:
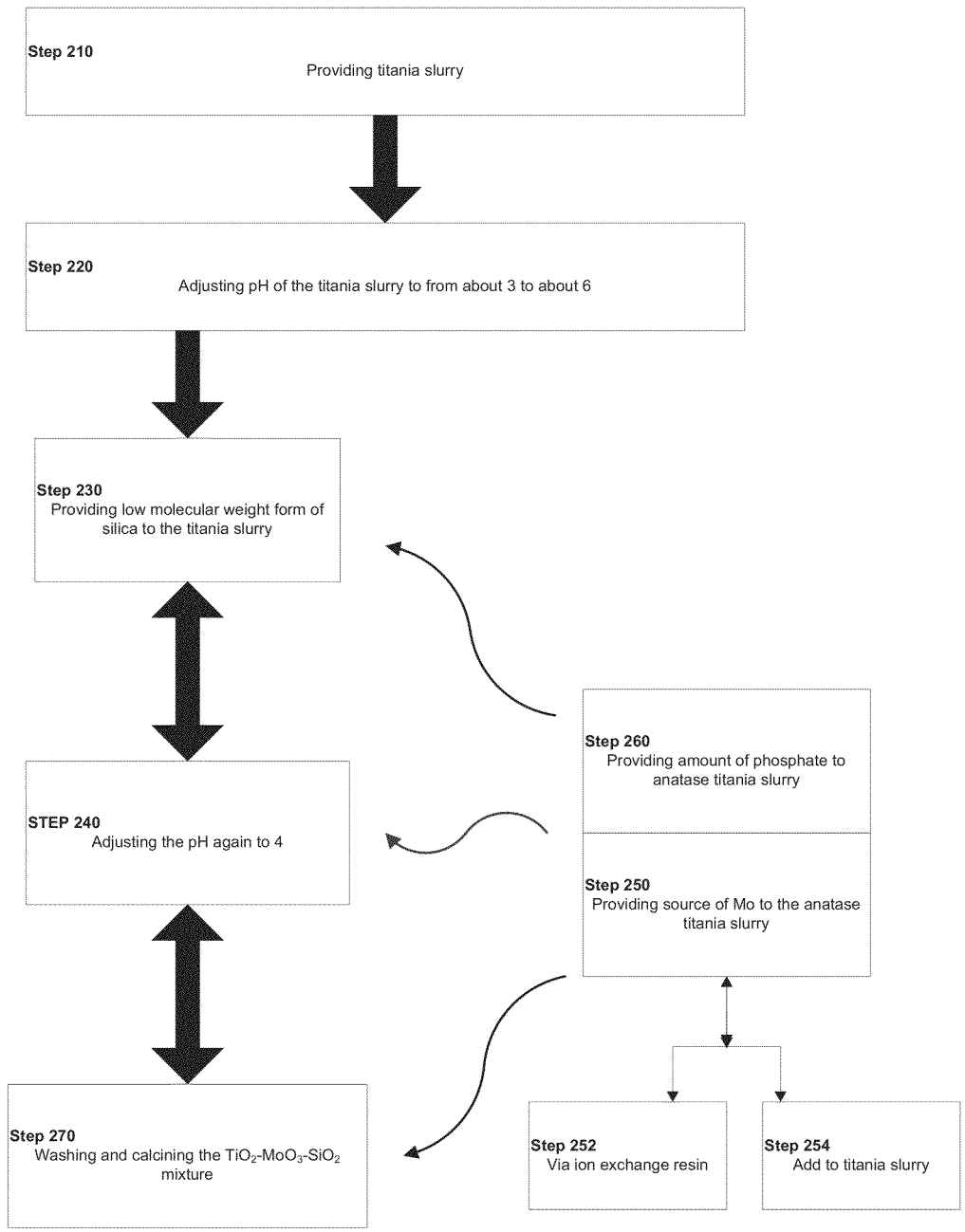
FIG. 2 is a flow chart of a method of making a catalyst support material in accordance with an embodiment of the invention.

In contrast to FIG. 1, FIG. 2 describes an embodiment of the invention of a method of making catalyst support materials. FIG. 2 is a flow chart of an embodiment of a method of making catalyst support material by controlling form and distribution of silica with molybdenum. The method is not limited by the order or frequency of the steps unless expressly noted. The method includes Step 210 providing titania slurry. Non-limiting examples of titania slurry include rutile, anatase, brookite, monoclinic, tetragonal orthorhombic as powders dispersed in water, and high pressure forms like 1α-PbO$_2$-like, baddeleyite-like, cotunnite-like, orthorhombic OI, and cubic phases, either individually or in a combination of two or more thereof. In an embodiment, Step 210 of providing titania slurry comprises providing anatase titania slurry. Non-limiting examples of anatase titania slurry include preformed titanium hydroxide, titanium oxy-hydroxide, orthotitanic acid, metatitanic acid, titanyl sulfate, sulfated titanium dioxide, sulfated titania hydrolysate, organotitanates or titanium dioxide particles, either individually or in a combination of two or more thereof.

Although some embodiments and examples have been described with anatase titania slurry in some of the descriptions, it should be understood that embodiments of the invention are not restricted to anatase titania slurry and include other forms of titania slurry, either individually or in a combination of two or more thereof.

Step 220 comprises optionally adjusting the pH of the titania slurry in a range from about 3 to about 6 as needed. An embodiment includes adjusting the pH a range from about 4 to about 5. Another embodiment includes adjusting the pH to about 4. pH may be adjusted with such as, but not limited to, dilute ammonium hydroxide, alkyl amines such as mono, di, or tripropyl amine, alkanol amines such as mono, di, and triethanolamine, either individually or in a combination of two or more thereof.

Step 230 comprises providing at least some low molecular weight form of silica to the titania slurry. An embodiment includes one or more low molecular weight forms of silica having a volume weighted median size of less than 4 nm and average molecular weight of less than 44,000, either individually or in a combination of two or more thereof. An embodiment of the invention includes Step 240 of optionally adjusting the pH of the titania slurry to a pH of from about 3 to about 6. Another embodiment includes adjusting the pH to a range from about 4 to about 5. Another embodiment includes adjusting the pH to about 4. pH may be adjusted with such as, but not limited to, dilute ammonium hydroxide, alkyl amines such as mono, di, and tripropyl amine, alkanol amines such as mono, di, and triethanolamine, either individually or in a combination of two or more thereof.

Silica

In an embodiment, low molecular weight forms of silica include but are not limited to silicic acid (Si(OH)$_4$). Examples of silicic acid include Si(OH)$_4$ generated by ion exchange of any of the cationic forms of silica listed herein using an acidic ion-exchange resin (e.g., ion-exchange of the alkali-silicate solutions or quaternary ammonium silicate solutions). Other non-limiting examples "silicic acid" which may be provided either individually or in a combination of two or more thereof include as described in Iler (op cit., Chapter 3), a detailed characterization of silicic acid using the $^{29}$Si nuclear magnetic resonance characterization, as described in G. Engelhardt and D. Michel (op cit. p. 100).

Although some embodiments have been described with silicic acid as an example of low molecular weight silica in some of the descriptions, it should be understood embodiments of the invention are not restricted to silicic acid and include other forms of low molecular weight silica, either individually or in a combination of two or more thereof.

In another embodiment, non-limiting examples of low molecular weight forms of silica having a volume weighted median size of less than 4 nm or average molecular weight of less than 44,000 include soluble precursor tetra (alkyl) ammonium silicate (i.e. tetramethylammonium silicate) and tetraethylorthosilicate (TEOS), either individually or in a combination of two or more thereof.

Unexpected advantages of using low molecular weight forms of silica having a volume weighted median size of less than 4 nm or average molecular weight of less than 44,000 to make catalyst support materials may include one or more of the following. The catalytic support materials may have unexpected improved stability and activity compared to conventional catalyst support materials with colloidal silica as discussed below in examples. Volatility of molybdenum may be reduced by at least 50% to greater than 80% compared to base line or conventional molybdenum volatilities while maintaining equivalent performance to conventional catalyst support materials. The catalytic support materials may exhibit retention of the anatase phase of titania, and surface area after severe thermal and/or hydrothermal treatments, even in the presence of vanadia.

Other examples of low molecular weight silica precursors which may be used include such as but not limited to aqueous solutions of silicon halides, silicon alkoxides, other silicon-organic compounds, fluoro-silicic acid salts, quaternary ammonium silicate solutions, aqueous sodium and potassium silicate solutions, and silicic acid (Si(OH)$_4$), either individually or in a combination of two or more thereof.

Non-limiting examples of aqueous solutions of silicon halides include anhydrous SiX$_4$, where X=F, Cl, Br, or I, either individually or in a combination of two or more thereof. Non-limiting examples of silicon alkoxides include Si(OR)$_4$, where R=methyl, ethyl, isopropyl, propyl, butyl, iso-butyl, sec-butyl, tert-butyl, pentyls, hexyls, octyls, nonyls, decyls, undecyls, and dodecyls, either individually or in a combination of two or more thereof. In an embodiment, examples of other silicon-organic compounds include such as, but not limited to, hexamethyldisilazane. In an embodiment, examples of fluoro-silicic acid salts include ammonium hexafluorosilicate [(NH$_4$)$_2$SiF$_6$]. In an embodiment, examples of quaternary ammonium silicate solutions include such as, but not limited to, (NR$_4$)n, (SiO$_2$), where R=H, or alkyls such as listed above, and n=0.1-2, either individually or in a combination of two or more thereof. Non limiting examples of aqueous sodium and potassium silicate solutions include Na$_2$SiO$_3$, K$_2$SiO$_3$, and MSiO$_3$ (wherein M is Na or K in varying amounts in ratio to Si), either individually or in a combination of two or more thereof.

An advantage of using low molecular weight forms of silica having a volume weighted median size of less than 4 nm or average molecular weight of less than 44,000 may include opportunity and availability for interaction with titania. An exception, as will be described below, involves subsequent modification of silica particles using conditions of pH1 and temperature wherein the silica particles have been dissolved and re-precipitated onto the titania surface.

In a particular embodiment, suitable silica precursors include highly alkaline solutions, referred to as the water soluble silicates as described in Iler (op cit., Chapter 2). These solutions are typically transparent since the silica particles, if present, are generally too small to scatter visible light. However, depending on the silica concentration and alkalinity, small particles of silica can form in these solutions. Iler (op cit., p. 133) estimates that for a SiO2: Na2O molar ratio of 3.1, the average number of silicon atoms per particle in dilute solutions is about 900, which is less than the 1500 silicon atoms per particle in the 4 nm particle described above. Such a silicate precursor, even though it may contain some nanoparticles above about 4 nm, is suitable for the present invention since most of the mass of the silica is in the form of smaller, low molecular weight species. Using alkali silicates, residual alkali ions such as Na may poison vanadia-based SCR catalysts.

In another embodiment, Step 230 providing low molecular weight form of silica comprises providing alkaline solution tetramethylammonium silicate.

Embodiments of the invention include repeating Step 230 providing at least some low molecular weight form of silica at intervals as desired and as many times as desired such as, but not limited to, before, during, and after Step 250, providing a source of Mo, either individually or a combination of two or more thereof.

It should be appreciated that embodiments of the invention include providing a plurality of low molecular weight forms of silica which differ from each other. The plurality of low molecular weight forms of silica may have various characteristics.

Furthermore, although embodiments of the invention have been described with providing at least some low molecular weight forms of silica, it should be understood that embodiments of the invention are not restricted to just providing the low molecular weight forms of silica and include further providing other forms of silica.

In an embodiment, in addition to Step 230 of providing some low molecular weight form of silica, the method includes further providing other forms of silica which differ from the low molecular weight forms of silica. Thus, in an embodiment, the total silica present in the catalyst support material is defined as the sum of low molecular weight form of silica and other forms of silica which differ from the low molecular weight form of silica.

In an embodiment, low molecular weight forms of silica comprise greater than 50% of the total silica present in the catalyst support material. In a particular embodiment, the low molecular weight form of silica comprising greater than 50% of the total silica present in the catalyst support material includes one or more low molecular weight forms having a volume weighted median size of less than 4 nm or average molecular weight of less than 44,000, either individually or in a combination of two or more thereof.

Step 250 comprises providing at least some source of Mo to the anatase titania slurry. As shown in FIG. 2, the method is not limited by sequential order or frequency of Step 250. Embodiments of the invention include Step 250 of providing a source of Mo before, during, or after Step 230 of providing low molecular weight form of silica.

An embodiment includes Step 250 providing at least some source of Mo and Step 230 of providing the low molecular weight form of silica sequentially. In a sequential embodiment, the method includes Step 250 of providing at least some source of Mo before providing Step 230 low molecular weight form of silica. When step 250 some source of Mo is provided before Step 230, an embodiment includes adjusting the pH to a range from about 1 to about 6. Another embodiment includes adjusting the pH to a range from about 4 to about 5. pH may be adjusted with such as, but not limited to, dilute ammonium hydroxide, alkyl amines such as mono, di, or tripropyl amine, alkanol amines such as mono, di, and triethanolamine, either individually or in a combination of two or more thereof. In another sequential embodiment, the method includes Step 250 of providing at least some source of Mo after Step 230 of providing the low molecular weight form of silica and after the optional step 240 of adjusting pH.

An embodiment of the method also includes providing Step 250 at least some source of Mo and Step 230 low molecular weight form of silica simultaneously.

Embodiments of the invention also include repeating Step 250 of providing at least some source of Mo at desired intervals and as many times as desired, such as, but not limited to, before, during, and after Step 230 of providing silica, either individually or a combination of two or more thereof.

It should be appreciated that the methods of making catalyst support material also includes the reaction product of the one or more sources of Mo with each other, the reaction product of the one or more forms of silica with the each other, and also the reaction product of the one or more sources of Mo with the one or more sources of silica, and other reaction products among present elements.

The method is also not limited by how the Step 250 source of Mo is provided. One or more sources of Mo may be provided before, during or after step 230 of providing form of silica by a method such as, but not limited to, ion-exchange per Step 252, to the slurry directly per Step 254, etc. either individually or a combination of two or more thereof. In an embodiment, at least some of the source of Mo is provided in Step 250 by ion exchange resin by Step 252. In another embodiment, at least some of the source of Mo is provided in Step 250 to the titania slurry directly by Step 254.

Source of Mo

In an embodiment, source of Mo include molybdenum oxide or soluble molybdenum oxide precursor, either individually or in a combination of two or more thereof. In a particular embodiment, molybdenum oxide is provided to the titania support material as a soluble precursor such as ammonium dimolybdate, ammonium heptamolybdate, ammonium paramolybdate tetrahydrate, ammonium phosphomolybdate in an amount to achieve a mole ratio of molybdenum to vanadium in a range of from about 0.5:1 to about 20:1 to form a catalyst comprising vanadium. In yet another embodiment, molybdenum oxide is added to the titania support material in an amount to achieve a mole ratio of molybdenum to vanadium in a range of from about 1:1 to about 10:1 to form a catalyst comprising vanadium.

In an embodiment, the method further includes providing a plurality of differing sources of Mo, either individually or in a combination of two or more thereof. In a particular embodiment, a plurality of differing sources of Mo are provided to anatase titania slurry after Step 230 of providing silica. In an embodiment, the plurality of differing sources of Mo may be provided to the anatase titania slurry by ion exchange resin by Step 252.

It should be appreciated that an embodiment of the method includes combining a titania slurry with i) silica and ii) one or more sources of Mo to form a $TiO_2$—$MoO_3$—$SiO_2$ mixture.

In an embodiment, the method further comprises Step 260 of optionally providing an amount of phosphate to the anatase titania slurry. Adding phosphate to a catalyst support material may have unexpected advantages such as, but not limited to, decreased $SO_2$ oxidation and improved ability to reduce $NO_x$ compared to without adding phosphate. In the presence of $SiO_2$, phosphorus at low levels surprisingly increases catalyst activity.

As shown in FIG. 2, the method is not limited by sequential order or frequency of Step 260 unless expressly noted otherwise. Embodiments of the invention include Step 260 of providing amount of phosphate before, during, or after Step 230 of providing low molecular weight form of silica.

In one embodiment, the method includes Step 260 of providing at least some amount of phosphate before Step 230 of providing at least some silica. Another embodiment includes Step 260 of providing amount of phosphate during Step 230 of providing at least some silica. In another embodiment, the method includes Step 260 of providing at least some amount of phosphate after Step 230 of providing at least some silica.

In an embodiment, Step 260 comprises providing an amount of phosphate before, during, or after Step 250 of providing Mo. In a particular embodiment, the method includes Step 260 of providing amount of phosphate before Step 250 of providing at least some source of Mo. Another embodiment includes Step 260 of providing an amount of phosphate during Step 250 of providing at least some source of Mo. In a particular embodiment, at least some of the source of Mo in Step 250 and an amount of phosphate in Step 260 are simultaneously provided. Another embodiment includes Step 260 of providing at least some amount of phosphate after Step 250 of providing at least some source of the Mo.

It should be appreciated that the method includes repeating Step 260 of providing an amount of phosphate at frequency intervals as desired and as many times as desired such as, but not limited to, before, during, and after Step 230 of providing low molecular weight form of silica, and before, during, and after Step 250 of providing at least some source of Mo, either individually or a combination of two or more thereof.

The method is also not limited by how the Step 260 amount of phosphate is provided. Amount of phosphate may be provided by a method such as, but not limited to, ion-exchange to the slurry directly, etc., either individually or a combination of two or more thereof. In an embodiment, the Step 260 amount of phosphate is provided by ion exchange resin. In a particular embodiment, the amount of phosphate is provided to the slurry by ion exchange resin before Step 250 of providing at least some source of Mo. In another embodiment, the amount of phosphate is added to the titania slurry by ion exchange resin simultaneously with Step 250 of providing at least some of the source of Mo.

Suitable phosphate-containing compounds include, but are not limited to, organic phosphates, organic phosphonates, phosphine oxides, $H_4P_2O_7$, $H_3PO_4$, polyphosphoric acid, $(NH_4)H_2PO_4$, $(NH_4)_2HPO_4$, and $(NH_4)_3PO_4$ either individually or in a combination of two or more thereof. In an embodiment, a plurality of differing sources of phosphate is provided. Furthermore, the phosphate can be present within the support material, or phosphate can be present on the surface of the support material.

In an embodiment, phosphate is added at levels to achieve a mole ratio of phosphorus to molybdenum of about 0.2:1 or greater. In some embodiments, phosphate is added in an amount to achieve a mole ratio of phosphorus to molybdenum in the range of from about 0.2:1 to about 4:1.

"Substantially Free" of Tungsten

Applicant has unexpectedly discovered that the low molecular weight form of silica may reduce Mo volatility compared to conventional methods of colloidal silica suspension or aqueous slurry of fumed solids. Furthermore, Applicant has also discovered that tungsten level may be reduced or replaced with Mo by using Mo in combination with the low molecular weight form of silica to control Mo volatility. It should be appreciated that embodiments of the invention include optionally reducing or replacing tungsten to levels as desired such as from none to 100% of the typical tungsten levels.

In one embodiment, the catalyst support material is substantially free of the presence of tungsten. In another embodiment, the catalyst is substantially free of tungsten. In one embodiment, the catalyst support material is substantially free of the presence of tungsten to an amount of less than about 1% by weight of the total catalyst support material.

"Substantially free" expressly allows the presence of trace amounts of the respective referred to substance either individually or in a combination of two or more, such as tungsten or iron, and is not to be limited to a specified precise value and may include values that differ from the specified value. In one embodiment, "substantially free" expressly allows the presence of trace amounts of tungsten by less than about 1%, by less than about 0.5%, and less than about 0.1%, either individually or in a combination. "Substantially free" expressly allows the presence of the respective trace amounts of a referred substance such as tungsten but does not require the presence of the referred substance, such as tungsten.

It should be understood that designs of low weight form of silica to reduce Mo volatility in the foregoing examples can be used to reduce volatility of other metals and substances such as, but not limited to, tungsten oxide, vanadium oxide, bismuth oxide, lead oxide, and the like, either individually or in a combination of two or more thereof.

Approximating language, as used herein throughout the specification and claims, may be applied to modify any quantitative or qualitative representation that could permissibly vary without resulting in a change in the basic function to which it is related. Accordingly, a value modified by a term such as "less than about" or "substantially free of" is not to be limited to a specified precise value and may include values that differ from the specified value. In at least some instances, the approximating language may correspond to the precision of an instrument for measuring the value. Furthermore, "removing or reducing $NO_x$" may be used in combination with a term and include a varying amount of $NO_x$ removal and is not to be limited to a specified precise value and may include values that differ from a specified value.

Phosphate and Tungsten

In other embodiments, the catalyst support material has more than trace presence of tungsten, i.e., the catalyst support material is not substantially free of the presence of tungsten. Tungsten level may be reduced by at least 80% compared to conventional catalyst support materials and catalyst. Tungsten levels may be reduced by at least 35% compared to conventional catalyst support materials and catalysts. Tungsten levels may be reduced by at least 10% compared to conventional catalyst support materials and catalysts.

In an embodiment, the catalyst support material has a mole ratio of phosphorus to tungsten of about 0.2:1 or greater, the resulting catalyst showed decreased $SO_2$ oxidation without significantly lower $NO_x$ conversion. In some embodiments, phosphate is added in an amount to achieve a mole ratio of phosphorus to tungsten in a range of from about 0.2:1 to about 4:1. Similarly, when both tungsten and molybdenum are present, phosphate is added at levels to achieve a mole ratio of phosphorus to tungsten plus molybdenum of about 0, 2:1 or greater, and in some embodiments, at levels to achieve a mole ratio of phosphorus to tungsten plus molybdenum in the range of from about 0.2:1 to about 4:1.

In an embodiment, the method further comprises Step 270 of washing and calcining the $TiO_2$—$MoO_3$—$SiO_2$ mixture.

The invention includes another embodiment of a method making a catalyst support material. The method includes: a) providing anatase titania slurry; and b) combining the anatase titania slurry with i) one or more volatility inhibitors comprising a low molecular weight form of the silica; and ii) primary promoter comprising molybdenum oxide to form a $TiO_2$—$MoO_3$—$SiO_2$ mixture. Low molecular weight forms of silica include forms of silica having a volume weighted median size of less than 4 nm and average molecular weight of less than 44,000, either individually or in a combination of two or more thereof.

Applicant has unexpectedly discovered volatility inhibitors comprising low molecular weight form of silica may reduce Mo volatility compared to conventional methods of colloidal silica suspension or aqueous slurry of fumed solids. Furthermore, Applicant has also discovered that tungsten levels may be reduced or replaced with Mo by using Mo in combination with volatility inhibitors comprising low molecular weight form of silica to control Mo volatility.

It should be appreciated that embodiments of the invention include providing a plurality of volatility inhibitors which differ from each other. The plurality of volatility inhibitors may have various characteristics.

Although embodiments of the invention have been described with volatility inhibitor comprising low molecular weight forms of silica, it should be understood that embodiments of the invention are not restricted to just providing volatility inhibitors that include low molecular weight form of silica and include further providing other forms of volatility inhibitors.

In an embodiment, in addition to providing volatility inhibitor comprising low molecular weight form of silica, the method includes further providing another volatility inhibitor which does not include low molecular weight form of silica. Thus, in an embodiment, the total amount of volatility inhibitor present in the catalyst support material is defined as the sum of volatility inhibitors comprising low molecular weight form of silica and other forms of volatility inhibitors which do not include low molecular weight form of silica.

In an embodiment, volatility inhibitor comprising low molecular weight form of silica comprises greater than 50% of the total volatility inhibitor present in the catalyst support material. In a particular embodiment, the low molecular weight form of silica comprising greater than 50% of the total volatility inhibitor present in the catalyst support material includes one or more low molecular weight forms of silica having a volume weighted median size of less than 4 nm or average molecular weight of less than 44,000, either individually or in a combination of two or more thereof.

Although embodiments of the invention have been described with primary promoter comprising molybdenum oxide, it should be understood that embodiments of the invention are not restricted to just providing primary promoter that include molybdenum oxide and include further providing other forms of understood that embodiments of the invention are not restricted to just providing primary promoters.

Catalyst Support Material

Embodiments of the invention also include catalyst support materials. In an embodiment, the catalyst support material includes: from about 86% to about 94% weight anatase titania dioxide; from about 0.1% to about 10% $MoO_3$% weight; and from about 0.1% to about 10% weight $SiO_2$ in low molecular weight forms. Low molecular weight forms of $SiO_2$ include one or more forms of silica having a volume weighted median size of less than 4 nm and average molecular weight (MW) of <44,000, either individually or in a combination of two or more thereof as discussed above. In a particular embodiment, the catalyst support material optionally comprises from about 0.01 to about 2.5% P.

In another embodiment, the catalyst support material comprises from about 86% to about 94% weight anatase titania particles, from about 0.2% to about 5% weight $MoO_3$, and from about 0.2% to about 5% weight $SiO_2$ in low molecular weight forms. Low molecular weight forms of $SiO_2$ include one or more forms of silica as discussed above, either individually or in a combination of two or more thereof as discussed above. In a particular embodiment, the catalyst support material optionally comprises from about 0.01 to about 2.5% P.

In an embodiment of the catalyst support material, $SiO_2$ comprises nanoparticles having diameters of less than 4 nm. In another embodiment, $SiO_2$ in the catalytic support material comprises low molecular weight of $SiO_2$ having a molecular weight of less than 44,000. In yet another embodiment, $SiO_2$ in the catalytic support material comprises greater than 50% of silicon atoms in the $Q^3$, $Q^2$, $Q^1$ and $Q^0$ coordination environments.

In an embodiment, the catalytic support material has a BET surface area of at least 50 $m^2/g$. In another embodiment of the catalyst support, $SiO_2$ is present at a fractional monolayer value of less than 0.5 before the catalyst support material is calcined.

In an embodiment, the catalyst support material includes anatase titania particles, a primary promoter comprising molybdenum oxide; a mole ratio of phosphorus to molybdenum in a range of from about 0:1 to about 4:1, and a volatility inhibitor comprising low molecular weight forms of silica. Low molecular weight forms of silica include forms of silica having a volume weighted median size of less than 4 nm and average molecular weight of less than 44,000, either individually or in a combination of two or more thereof. It should be appreciated that embodiments of such catalyst support materials comprising volatility inhibitors include one or more volatility inhibitors described above, either individually or in a combination of two or more thereof.

Another embodiment of the catalyst support material includes a general formula of $TiO_2$—$MoO_3$—$SiO_2$, wherein the titanium dioxide is substantially in an anatase form and the silicon oxide has a volume weighted median size less than 4 nm and an average molecular weight of less than 44,000.

It should also be appreciated that the catalytic support material includes the reaction product of anatase titanium oxide with each other, reaction product of $MoO_3$ with each other, reaction product of P with each other, reaction product of $SiO_2$ with each other and also the reaction product of oxides of the elements with each other in general.

Method of Making a Catalyst

With reference to FIG. 3, next is described an embodiment of the invention of making a catalyst. FIG. 3 is a flow chart of an embodiment of a method making a catalyst and is limited by the order or frequency of the steps unless expressly noted.

The method includes Step 310 of combining the $TiO_2$—$MoO_3$—$SiO_2$ mixture with $V_2O_5$ to form a vanadia catalyst. The method may further optionally comprise Step 320 of calcining the vanadia catalyst, such as around 600° C.

Catalyst

Embodiments of the invention also include catalysts. In an embodiment, the catalyst includes from about 86% to about 94% weight anatase titanium dioxide; from about 0.1% to about 10% weight $MoO_3$, from about 0.1% to about 10% weight $SiO_2$, and from about 0.5% to about 3% weight $V_2O_5$. $SiO_2$ includes a low molecular weight form having a volume weighted median size of less than 4 nm and average molecular weight of less than 44,000, either individually or in a combination of two or more thereof. In a particular embodiment, the catalyst optionally comprises from about 0.01 to about 2.5% weight P.

In an embodiment, the catalyst includes from about 86% to about 94% weight anatase titania particles, from about 0.2% to about 5% weight $MoO_3$, from about 0.1% to about 10% weight $SiO_2$, and from about 0.5% to about 3% weight $V_2O_5$. $SiO_2$ includes a low molecular weight form of silica having a volume weighted median size of less than 4 nm and average molecular weight of less than 44,000, either individually or in a combination of two or more thereof. In a particular embodiment, the catalyst optionally comprises from about 0.01% to about 2.5% weight P.

In another embodiment, the catalyst comprises from about 0.3% to about 1.5% weight $V_2O_5$. In yet another embodiment, the catalyst comprises from about 0.5% to about 0.9% weight $V_2O_5$.

Use of the Catalyst

Embodiments of the invention also include methods of using the catalysts to reduce the nitrogen oxide content of nitrogen oxide-containing liquid or gas. A method includes contacting the nitrogen oxide gas or liquid with a catalyst for a time sufficient to reduce the level of $NO_x$ in the nitrogen oxide-containing gas or liquid. In an embodiment, the catalyst includes from about 86% to about 94% weight anatase titanium dioxide, from about 0.1% to about 10% weight $MoO_3$, from about 0.5% to about 3% weight $V_2O_5$, and from about 0.1 to about 10% weight $SiO_2$ in low molecular weight forms. Low molecular weight forms of $SiO_2$ include one or more forms of silica having a volume weighted median size of less than 4 nm and average molecular weight of less than 44,000, either individually or in a combination of two or more thereof. In a particular embodiment, catalyst optionally comprises from about 0.01 to about 2.5% weight P.

It should be appreciated embodiments of the invention include methods of reducing the nitrogen oxide content of a nitrogen oxide-containing liquid or gas by contacting the nitrogen oxide-containing gas or liquid with one or more embodiments of the catalysts described above, either individually or in a combination of two or more thereof.

The $NO_x$ reducing additives described above can be added as a formed structure such as a monolith or an extrudate in a fixed bed reactor or any conventional reactor-regenerator systems, to fluidized bed systems, to systems which involve continuously conveying or circulating catalysts/additives between reaction zone and regeneration zone, and the like. Typical of the circulating bed systems are the conventional moving bed and fluidized bed reactor-regenerator systems. The $NO_x$ reducing catalysts can be used in an amount of at least 1%; at least 2%; or at least 5%; in an amount of at least about 10% of the inventory of the regenerator; or in an amount of at least about 20% of the inventory of the regenerator to reduce nitrogen oxide content.

Embodiments of the methods also include contacting the nitrogen oxide-containing gas in the presence of one or more reducing agents such as ammonia, hydrocarbons, hydrogen, carbon monoxide, and the like, either individually or in a combination of two or more thereof, with one or more embodiments of the catalysts described in embodiments of the invention at various environment conditions such as full burn and low oxygen environment conditions. Examples of low oxygen environment condition include, but are not limited to, partial burn units, partial combustion units, mixed mode, full combustion units with poor air circulation, etc.

Another embodiment includes contacting a nitrogen oxide-containing gas or liquid with a catalyst for a time sufficient to reduce the level of $NO_x$ in the nitrogen oxide-containing gas or liquid, wherein the catalyst is made by:
  (a) providing an anatase titania slurry; and
  (b) combining the anatase titania slurry with i) one or more low molecular weight forms of silica and ii) a source of Mo, to form a $TiO_2$—$MoO_3$—$SiO_2$ mixture. Low molecular weight forms of silica include forms of silica having a volume weighted median size of less than 4 nm and average molecular wt of less than 44,000, either individually or in a combination of two or more thereof.

It should be appreciated embodiment of the invention include methods of reducing the nitrogen oxide content of nitrogen oxide-containing liquid or gas by contacting the nitrogen oxide-containing gas or liquid with one or more catalysts made by embodiments of the methods described above, either individually or in a combination of two or more thereof.

The $NO_x$ reducing additives described above can be added as a formed structure such as a monolith or an extrudate in a fixed bed reactor or any conventional reactor-regenerator systems, to fluidized bed systems, to systems which involve continuously conveying or circulating catalysts/additives between reaction zone and regeneration zone, and the like. Typical of the circulating bed systems are the conventional moving bed and fluidized bed reactor-regenerator systems. The $NO_x$ reducing catalysts can be used in an amount of at least 1%; at least 2%; or at least 5%; in an amount of at least about 10% of the inventory of the regenerator; or in an amount of at least about 20% of the inventory of the regenerator to reduce nitrogen oxide content.

Embodiments of the methods also include contacting the nitrogen oxide-containing gas in the presence of a reducing agent such as ammonia, hydrocarbons, hydrogen, carbon monoxide, and the like with one or more embodiments of the catalysts described in embodiments of the invention at various environment conditions such as full burn and low oxygen environment conditions. Examples of low oxygen environment condition include, but are not limited to, partial burn units, partial combustion units, mixed mode, full combustion units with poor air circulation, etc.

EXAMPLES

The following examples illustrate the features of embodiments of the invention and are not intended to limit the invention thereto. Although some parts of examples 1-12e are written in present tense, the examples were conducted and illustrate non-limiting difference(s) between embodiments of this invention compared to conventional techniques.

Molybdenum volatility was determined in the following manner. 0.2 g of catalyst (0.7-1.2 mm particle size $TiO_2$—$SiO_2$) is supported by quartz wool in a 9" long, ⅜" OD quartz tube fitted at both ends with open ball joints. 0.2 g of 255 m²/g gamma alumina (Alfa-Aesar 0.7-1.4 mm particle size) is added from the opposite end of the tube to prevent cross-contamination. It is also suspended on a plug of quartz glass wool. The tube is attached via the ball joints to a plug flow reactor. The temperature is raised to 700° C. and a carrier gas of composition 10% water vapor, 10% $O_2$, 500 ppm NO, 500 ppm $NH_3$, balance $N_2$ is passed over the catalyst toward the alumina bed. After 2 hrs, the catalyst and alumina beds are cooled. The catalyst is removed from one end of the tube and the alumina is removed from the other end to prevent cross-contamination. Each powder sample is then dissolved with HF and analyzed separately with ICPOES (Inductively Coupled Plasma Optical Emission Spectroscopy) for Mo content. The molybdenum sublimed from the catalyst is calculated by dividing the amount of Mo on the alumina by the sum of molybdenum present on the titania and alumina supports. The mass balance for the experiment is calculated by dividing the sum of Mo detected on the titania and alumina supports after the hydrothermal treatment by the amount of Mo measured on the titania support prior to the hydrothermal treatment.

$DeNO_x$ conversion was determined using a catalyst in the powder form without further shaping. A ⅜" quartz reactor holds 0.2 g catalyst supported on glass wool. The feed composition is 1000 ppm of NO, 5% $O_2$, 5% $H_2O$, varying amounts of $NH_3$ from 0 to 1200 ppm, and balance $N_2$. NO conversion is measured at 250, 350, and 450° C. at atmospheric pressure and recorded as a function of increasing ammonia partial pressure in the reactor feed. The reactor effluent is analyzed with an infrared detector to determine NO conversion and $NH_3$ slip.

$SO_2$ oxidation was determined with a catalyst in powder form without further shaping. A ⅜" quartz reactor holds 0.2 g catalyst supported on glass wool. The feed composition is 500 ppm $SO_2$, 20% $O_2$, balance $N_2$. The space velocity is 29.5 l/g.cat-hr calculated at ambient conditions. Conversion data is recorded at 550° C.

Example 1

An embodiment of the presently disclosed and/or claimed inventive concept(s) was prepared in the following manner. A 370.7 g sample of anatase titanium hydrolysate slurry (26.3% solids), produced via the sulfate process (Trade name—GI from Millennium Inorganic Chemicals), is heated to 60° C. via a temperature controlled hot plate, and the temperature is maintained at 60° C. throughout the preparation. The pH is adjusted to 4 with dilute ammonium hydroxide. A dilute solution (1 w % $SiO_2$) of sodium silicate is prepared by adding 1.7 g of Inobond Na-401 sodium silicate (29.4 w % as $SiO_2$) to 48.4 g of deionized water. A 20 g portion (as received basis) of strong acid ion-exchange resin Dowex™ 650C H-form is weighed out and placed in a buret column. (Dowex™ 650C H-form ion exchacge resin was used in the examples below and is available by The Dow Chemical Company, US) The dilute silicate solution is added through the column containing the ion exchange resin to the slurry at a rate of 5 ml/min. After complete addition, the ion exchange resin in the column is rinsed with 10 ml of deionized water added at a rate of 5 ml/min into the titania slurry. The pH is again adjusted to 4 with ammonium hydroxide and allowed to react for 20 min. A second solution is prepared by dissolving 3.68 g of ammonium heptamolybdate and 0.55 g of 85% phosphoric acid in 20 ml water. This solution is added to the slurry via the ion exchange column at a rate of 5 ml/min, and after the addition is complete the pH of the mixture is adjusted to 4 with dilute ammonium hydroxide and allowed to react for 10 min. The mixture is filtered, rinsed with 1.0 liter of deionized water, dried at 105° C., and then calcined at 530° C. for 6 hrs. The targeted loading for the catalyst support is 0.5 w % $SiO_2$, 0.15 w % P, and 2 w % Mo.

Prior to volatility studies, 1.3 w % vanadia is added to the sample via the following method. A 20 g sample of the prepared support is slurried in 50 ml water. To this, vanadium pentoxide [$V_2O_5$] (0.266 g) and monoethanolamine [$HOCH_2CH_2NH_2$] (0.222 g) are added and the temperature of the mixture is raised to 60° C. The pH is adjusted to 8 with ammonium hydroxide and the mixture is allowed to stir for 15 min. The solids are separated via filtering, dried at 100° C. for 6 hrs, and calcined at 600° C. for 6 hrs in air.

Prior to DeNO$_x$ testing and measurement of $SO_2$ oxidation, 0.9% vanadia is added to the sample via the following method. A 20 g sample of the prepared support is slurried in 50 ml water. To this, vanadium pentoxide (0.184 g) and monoethanolamine (0.154 g) are added and the temperature of the mixture is raised to 60° C. The pH is adjusted to 8 with ammonium hydroxide and the mixture is allowed to stir for 15 min. The solids are separated via filtering, dried at 100° C. for 6 hrs, and calcined at 600° C. for 6 hrs in air.

Example 2

In a second embodiment of the method, the order of addition of silica and the molybdenum and phosphorus solutions were reversed such that the molybdenum and phosphorus solution is added through the ion exchange column prior to the silica solution. Vanadia is added as described in Example 1.

Comparative Example 1

A 440.0 g sample of anatase titanium hydrolysate slurry (23.2% solids) is heated to 60° C. via a temperature controlled hot plate and the temperature is maintained throughout the preparation. A molybdenum solution is prepared by dissolving 4.64 g of ammonium heptamolybdate in 100 ml water and this solution is added directly to the slurry. The pH is adjusted to 5 with ammonium hydroxide and allowed to mix 10 min. The mixture is filtered, dried at 105° C., and then calcined at 530° C. for 6 hrs. The targeted loading is 2 w % Mo. Vanadia is added as described in Example 1.

Comparative Example 2

A support is prepared as described in Comparative Example 1 but with the exception that the filtrate is washed with 1 liter of deionized water to remove soluble spectator ions such as ammonia prior to drying and calcination. The targeted loading is 2 w % Mo. Vanadia is added as described in Example 1, Example 3a A 183.3 g sample of anatase titanium hydrolysate slurry (26.6% solids) is heated to 60° C. via a temperature controlled hot plate and the temperature is maintained throughout the preparation. A molybdenum solution is prepared by dissolving 1.84 g of ammonium heptamolybdate in 20 ml water. This solution is added to the slurry. After the addition is complete, the pH of the mixture is adjusted to 5 with a dilute ammonium hydroxide solution and allowed to react for 10 min. A dilute solution (1 w % $SiO_2$) of sodium silicate is prepared by adding 0.85 g of Inobond Na-4011 sodium silicate (29.4 w % as $SiO_2$) to 24.1 g of deionized water. A 10 g portion (as received basis) of strong acid ion-exchange resin (Dowex™ 650C H-form) is weighed out and placed in a buret column. The dilute silicate solution is added through the column containing the ion exchange resin to the slurry at a rate of 10 ml/mm. The column is then rinsed with 10 ml of deionized water at a feed rate of 10 ml/min. The pH is again adjusted to 5 with ammonium hydroxide and allowed to react for 20 min. The mixture is filtered, rinsed with 500 ml DI water, dried at 105° C., and then calcined at 530° C. for 6 hrs. The targeted loading is 0.5 w % $SiO_2$, and 2 w % Mo. Vanadia is added as described in Example 1.

Example 3b

A catalyst support is prepared as described in Example 3a with the exception that the order of addition of molybdenum and silica are reversed such that silica is added prior to molybdenum. Vanadia is added as described in Example i.

The results of volatility testing are shown in Table below:

TABLE 1

| Example | Mo on Catalysts Before Test (g) | Mo on Catalysts After Test (g) | Mo on Alumina (g) | Mass Balance | Mo Retained | Mo Loss |
|---|---|---|---|---|---|---|
| Example 1 | 1.91 | 1.82 | 0.07 | 99.0% | 96.3% | 3.7% |
| Example 2 | 1.98 | 1.84 | 0.12 | 99.0% | 93.9% | 6.1% |
| Comparative Example 1 | 2.07 | 1.44 | 0.61 | 99.0% | 70.2% | 29.5% |
| Comparative Example 2 | 1.98 | 1.76 | 0.33 | 105.6% | 84.2% | 15.8% |
| Example 3a | 1.82 | 1.86 | 0.16 | 111.0% | 92.1% | 7.9% |
| Example 3a | 1.98 | 1.82 | 0.12 | 98.0% | 93.8% | 6.2% |
| Example 3a | 1.99 | 1.89 | 0.11 | 100.5% | 94.5% | 5.5% |
| Example 3a | 1.96 | 1.86 | 0.13 | 101.5% | 93.5% | 6.5% |
| Example 3a | 1.94 | 1.83 | 0.15 | 102.1% | 92.4% | 7.6% |
| Example 3a | 2.05 | 1.93 | 0.13 | 100.5% | 93.7% | 6.3% |
| Example 3b | 1.92 | 1.79 | 0.13 | 100.0% | 93.2% | 6.8% |
| Example 3b | 1.97 | 1.88 | 0.12 | 101.5% | 94.0% | 6.0% |
| Example 3b | 1.90 | 1.79 | 0.16 | 102.6% | 91.8% | 8.2% |
| Example 3b | 1.96 | 1.93 | 0.13 | 105.1% | 93.7% | 6.3% |
| Example 3b | 1.95 | 1.82 | 0.16 | 101.5% | 91.9% | 8.1% |
| Example 3 Average | | | | 102.2% | 93.1% | 6.9% |

Comparative Example 2 relative to Comparative Example 1 shows advantages of removing spectator ions by using a washing step with a 10-fold excess of deionized water. Such evidence demonstrates an advantage of an embodiment of the invention include molybdenum retention. Example 1 shows significant further attenuation of molybdenum volatility. Further, comparison of Example 1 with Example 2 shows that molybdenum volatility is at least partially related or influenced by the order at which silica versus molybdenum and phosphorus are added using the ion exchange column. Example 3 represents 11 repetitions of both the preparation method and the volatility test. These results show testing variability, in addition to demonstrating that the order of addition is not important for compositions including just molybdenum and silica. Additionally, the repetitions demonstrate that this simple method of preparation is also effective in reducing Mo volatility relative to the Comparative Examples.

Example 4

In order to show the effect of increasing silica content on molybdenum volatility, catalyst supports are prepared as described in Example 3b with the exception that the target silica loading is increased to 0.75% (Example 4a) and 1.0% (Example 4b). Vanadia is added as described in Example 1.

Comparative Example 3

In order to show the unexpected advantages of adding silica through the ion exchange column, a comparable catalyst support is prepared using colloidal silica. A 182.0 g of anatase titanium hydrolysate slurry (26.8% solids) is heated to 60° C. via a temperature controlled hot plate and the temperature is maintained throughout the preparation. A molybdenum solution is prepared by dissolving 1.84 g of ammonium heptamolybdate in 20 ml water. This solution is added to the slurry. After the addition is complete, the pH of the mixture is adjusted to 5 with dilute ammonium hydroxide and allowed to react for 10 min. A colloidal dispersion of silica (Trade name—Ludox AS-30 from Grace Davison (30% solids)) is diluted by mixing 1 g with 29 g of deionized water, and 25 ml is added to the titania slurry. The pH is again adjusted to 5 with ammonium hydroxide and allowed to react for 20 min. The mixture is filtered, rinsed with 500 ml DI water, dried at 105° C., and then calcined at 530° C. for 6 hrs. The targeted loadings are 0.5 w % $SiO_2$, and 2 w % Mo. Vanadia is added as described in Example 1.

Comparative Example 4

In order to show the unexpected advantage of adding silica through the ion exchange column, a comparable catalyst support is prepared using fumed silica. A 182.0 g of anatase titanium hydrolysate slurry (26.8% solids) is heated to 60° C. via a temperature controlled hot plate and the temperature is maintained throughout the preparation. A molybdenum solution is prepared by dissolving 1.84 g of ammonium heptamolybdate in 20 ml water. This solution is added to the slurry and, after the addition is complete, the pH of the mixture is adjusted to 5 with a dilute ammonium hydroxide solution and allowed to react for 10 min. A slurry of fumed silica (Trade name—Aerosil 200 from Evonik) is prepared by adding 0.25 g to 25 ml and adding this to the titania slurry. The pH is again adjusted to 5 with ammonium hydroxide and allowed to react for 20 min. The mixture is filtered, rinsed with 500 ml DI water, dried at 105° C., and then calcined at 530° C. for 6 hrs. The targeted loadings are 0.5 w % $SiO_2$, and 2 w % Mo. Vanadia is added as described in Example 1.

Example 5

In order to show the effect of adding silica and molybdenum together through the ion exchange column, the preparation is modified in the following manner.

A 370.7 g sample of anatase titanium hydrolysate slurry (26.3% solids) is heated to 60° C. via a temperature controlled hot plate and the temperature is maintained throughout the preparation. The pH is adjusted to 5 with a dilute ammonium hydroxide solution. A dilute solution (1 w % $SiO_2$) of sodium silicate is prepared by adding 1.7 g of Inobond Na-4011 sodium silicate (29.4 w % as $SiO_2$) to 48.4 g of deionized water. 3.68 g of ammonium heptamolybdate is added to the silica solution. A 20 g portion (as received basis) of strong acid ion-exchange resin (Dowex™ 650C H-form) is weighed out and placed in a buret column. The dilute silicate and molybdenum solution is added through a column containing the ion exchange resin to the slurry at a rate of 5 ml/min. The pH is again adjusted to 5 with ammonium hydroxide and allowed to react for 20 min. The mixture is filtered, rinsed with 1.0 liter of deionized water, dried at 105° C., and then calcined at 530° C. for 6 hrs. The targeted loadings are 0.5 w % $SiO_2$ and 2 w % Mo. Vanadia is added according to the method described in Example 1.

Example 6a

To show that molybdenum and silica can be added in a number of ways effective in reducing Mo volatility, the method of preparation was varied in the following manner.

A 370.7 g sample of anatase titanium hydrolysate slurry (26.3% solids) is heated to 60° C. via a temperature controlled hot plate and the temperature is maintained throughout the preparation. Molybdenum is combined to the slurry to achieve a 0.5 w % Mo loading by adding 0.92 g ammonium heptamolybdate. The pH is adjusted to 5 with dilute ammonium hydroxide. A dilute solution (1 w % $SiO_2$) of sodium silicate is prepared by adding 1.7 g of Inobond Na-4011 sodium silicate (29.4 w % as $SiO_2$) to 48.4 g of deionized water. 2.76 g ammonium heptamolybdate is added to the silica solution for a target proportion of 1.5% Mo and in order to make the total Mo loading of the support 2 w %. A 20 g portion (as received basis) of strong acid ion-exchange resin (Dowex™ 650C H-form) is weighed out and placed in a buret column. The dilute silicate and molybdenum solution is added through a column containing the ion exchange resin to the slurry at a rate of 5 ml/min. The pH is again adjusted to 5 with ammonium hydroxide and allowed to react for 20 min. The mixture is filtered, rinsed with 1.0 liter of deionized water, dried at 105° C., and then calcined at 530° C. for 6 hrs. The targeted loadings are 0.5 w % $SiO_2$, and 2 w % Mo, in which 0.5 w % Mo is added to the slurry directly and 1.5 w % is added with the silica solution through the ion exchange column. Vanadia is added as described in Example 1.

Example 6b

A catalyst support is prepared as described in Example 6a with the exception that 1.0 w % Mo is added to the slurry directly and 1.0 w % is added with the silica solution through the ion exchange column for a total of 2 w % Mo added to the support. Vanadia is added as described in Example 1.

Example 6c

A catalyst support is prepared as described in Example 6a with the exception that 1.5 w % Mo is added to the slurry directly and 0.5 w % is added with the silica solution through the ion exchange column for a total of 2 w % Mo added to the support. Vanadia is added as described in Example 1.

Example 7a

To show the effect phosphorus has on reducing molybdenum volatility the following supports were prepared.

A 348.8 g sample of anatase titanium hydrolysate slurry (27.9% solids) is heated to 60° C. via a temperature controlled hot plate and the temperature is maintained throughout the preparation. The pH is adjusted to 4 with a dilute ammonium hydroxide solution. A molybdenum and phosphorus solution is prepared by dissolving 3.68 g of ammonium heptamolybdate and 0.55 g of 85% phosphoric acid in 20 ml water. A 10 g portion (as received basis) of strong acid ion-exchange resin (Dowex™ 650C H-form) is weighed out and placed in a buret column. The molybdenum and phosphorus solution is added through the column containing the ion exchange resin to the slurry at a rate of 5 ml/min. The pH is again adjusted to 4 with ammonium hydroxide and allowed to react for 20 min. The mixture is filtered, rinsed with 1.0 liter of deionized water, dried at 105° C., and then calcined at 530° C. for 6 hrs. The targeted loadings are 0.15 w % P and 2 w % Mo. Vanadia is added as described in Example 1.

Example 7b

A 348.8 g sample of anatase titanium hydrolysate slurry (27.9% solids) is heated to 60° C. via a temperature controlled hot plate and the temperature is maintained throughout the preparation. The pH is adjusted to 4 with dilute ammonium hydroxide. A molybdenum and phosphorus solution is prepared by dissolving 3.68 g of ammonium heptamolybdate and 0.55 g of 85% phosphoric acid in 20 ml water. The molybdenum and phosphorus solution is added directly to the slurry at a rate of 5 ml/min. The pH is again adjusted to 4 with ammonium hydroxide and allowed to react for 20 min. The mixture is filtered, rinsed with 1.0 liter of deionized water, dried at 105° C., and then calcined at 530° C. for 6 hrs. The targeted loadings are 0.15 w % P and 2 w % Mo.

The results of volatility testing for Examples 4-7 and Comparative Examples 3 and 4 are shown in Table 2 below:

TABLE 2

| Example | Mo on Catalysts Before Test (w %) | Mo on Catalysts After Test (w %) | Mo on Alumina (w %) | Mass Balance | Mo Retained | Mo Loss |
|---|---|---|---|---|---|---|
| Example 4a | 1.86 | 1.80 | 0.11 | 102.7% | 94.2% | 5.8% |
| Example 4b | 1.89 | 1.84 | 0.10 | 102.4% | 95.1% | 4.9% |
| Comparative Example 3 | 2.00 | 1.75 | 0.34 | 104.5% | 83.7% | 16.3% |
| Comparative Example 4 | 1.97 | 1.81 | 0.32 | 108.1% | 85.0% | 15.0% |
| Example 5 | 1.81 | 1.59 | 0.05 | 90.6% | 96.9% | 3.1% |
| Example 6b | 1.91 | 1.92 | 0.06 | 103.6% | 97.0% | 3.0% |
| Example 6c | 1.90 | 1.90 | 0.08 | 104.2% | 96.0% | 4.0% |
| Example 6d | 1.93 | 1.82 | 0.09 | 99.1% | 95.2% | 4.8% |
| Example 7a | 1.90 | 1.68 | 0.23 | 100.5% | 88.0% | 12.0% |
| Example 7b | 1.97 | 1.79 | 0.19 | 100.5% | 90.4% | 9.6% |

The results of Example 4 suggest that increasing the silica content of the support improves Mo retention. Comparative Examples 3 and 4 show that neither colloidal nor fumed silica added to the catalyst support prep have any measurable effect on molybdenum volatility in contrast to what is demonstrated by the improvement gained by adding silica through the ion exchange column. Examples 5 and 6 show that molybdenum can be added in any combination of directly and through the ion exchange column in combination with silica while maintaining effectiveness in reducing Mo volatility. Examples 7a and 7b show some apparent reduction of Mo volatility induced by adding P and Mo through the ion exchange as opposed to directly adding to the slurry, but this improvement is not to the same degree as that induced by $SiO_2$ and Mo alone. Finally, comparison of Example 3a and 3b ($SiO_2$ added only) and Example 7 (P added only) with Examples 1, 5, and 6 (Si and P both added to the support prep) suggests that the improvement in Mo retention induced by the combination of Si and P is additive.

Example 8a

A catalyst support is prepared as described in Example 2 with the exception that 0.73 g of 85% phosphoric acid is added to achieve a 0.20 w % P loading.

Example 8b

A catalyst support is prepared as described in Example 2 with the exception that 0.92 g of 85% phosphoric acid is added to achieve a 0.25 w % P loading. 0.9% vanadia is added in each case as described in Example 1.

The performances of catalysts prepared in Examples 2, 3a, 8a, and 8b are compared in FIG. 4. Although adding 0.15 w % P appears to initially decrease both total $NO_x$ conversion and that at 10 ppm slip, as P increases to 0.2 w % and 0.25 w % the maximum $NO_x$ conversion and NO conversion at 10 ppm slip increase as well. Such results are unexpected as it is commonly accepted in the art that P acts as a poison for $NO_x$ conversion. And, although certain disclosures claim that P can be added to levels at which $NO_x$ conversion is not compromised (e.g., see, US20100183492, Kato et al.), the prior art does not disclose or suggest that P can actually increase $NO_x$ conversion as shown above.

The data from FIG. 4 help generate values listed in the tables below. "$NO_x$ Conversion at 10 ppm Slip" is calculated as the value measured as the trend line crosses 10 ppm ammonia slip due to the increase in ammonia partial pressure in the reactor. "Maximum $NO_x$ Conversion" is determined as the maximum value of conversion as ammonia partial pressure is increased from 0 to 1200 ppm.

TABLE 3

| Example | Phosphorus Loading (%) | NOx Conversion at 10 ppm Slip | | Maximum NOx Conversion | | $SO_2$ Oxidation @ 550 C. (%) |
|---|---|---|---|---|---|---|
| | | @ 350 C. (%) | @ 450 C. (%) | @ 350 C. (%) | @ 450 C. (%) | |
| 1 | 0.15 | 42.5 | 77.9 | 97.5 | 97.6 | 10.0 |
| 2 | 0.15 | 39.3 | 63.7 | 72.9 | 96.1 | 10.5 |
| 3a | 0.00 | 50.4 | 58.4 | 75.8 | 97.9 | 15.9 |
| 7a | 0.15 | 68.7 | 89.8 | 82.1 | 99.4 | 12.4 |
| 7b | 0.15 | 72.7 | 95.0 | 86.1 | 100.0 | 9.7 |
| 8a | 0.20 | 73.2 | 95.9 | 81.7 | 100.0 | 11.3 |
| 8b | 0.25 | 81.3 | 53.3 | 90.6 | 86.5 | 8.2 |

Comparing the results from Example 3a to those of Examples 1, 2, 7a, 7b, 8a, and 8l) shows that, as reported in the prior art, adding phosphorus to the catalyst support decreases $SO_2$ oxidation. As mentioned previously, our data also surprisingly show that total $NO_x$ conversion and that at 10 ppm ammonia slip increases as phosphorus loading is increased from 0.15 to 0.25 w % for reactor tests done at 350 C. However, it appears to pass through a maximum at approximately 0.20 w % P for reactor tests performed at 450° C. Examples 7a and 7b show that activity further increases in the absence of silica and that the degree of $NO_x$ conversion at 10 ppm ammonia slip may be influenced by the manner in which molybdenum and phosphorus are added to the support, either through the ion exchange column (7a) or directly to the slurry (7b).

Example 9a

A catalyst support is prepared as described in Example 3a with the exception that 0.56 g of 85% phosphoric acid is added to achieve a 0.15 w % P loading.

Example 9b

A catalyst support is prepared as described in Example 3a with the exception that 0.73 g of 85% phosphoric acid is added to achieve a 0.20 w % P loading.

Example 9c

A catalyst support is prepared as described in Example 3a with the exception that 1.10 g of 85% phosphoric acid is added to achieve a 0.30 w % P loading.

Example 9d

A catalyst support is prepared as described in Example 3a with the exception that 1.47 g of 85% phosphoric acid is added to achieve a 0.40 w % P loading. In each case, 0.9% vanadia is added as described in Example 1.

Example 10a

To determine if the efficacy of phosphorus in increasing $NO_x$ conversion and decreasing $SO_2$ oxidation is limited to when it is added in the support prep, the preparation of the catalyst was modified to combine small amounts of phosphoric acid with vanadium pentoxide.

A 20 g sample of the prepared support as described in Example 1 is slurried in 50 ml water. To this, vanadium pentoxide (0.184 g) and monoethanolamine (0.154 g) are added and the temperature of the mixture is raised to 60° C. to achieve a target $V_2O_5$ loading of 0.9%. Phosphorus is added to the slurry by introducing 0.037 g of 85% $H_3PO_4$ solution to achieve a target loading of 0.05% in addition to the 0.15% already present on the support. The pH is adjusted to 8 with ammonium hydroxide and the mixture is allowed to stir for 15 minutes. The solids are separated via filtering, dried at 100° C. for 6 hrs, and calcined at 600° C. for 6 hrs in air.

Example 10b

A catalyst is prepared in the same manner as described in Example 10a with the exception that 0.074 g of 85% phosphoric acid is added to achieve a target loading of 0.1 w % P in addition to the 0.15% already present on the support.

The reactor performance of Examples 9 and 10 are shown in Table 4 below.

TABLE 4

| Example | Total Phosphorus Loading (%) | NOx Conversion at 10 ppm Slip @ 350 C. (%) | NOx Conversion at 10 ppm Slip @ 450 C. (%) | Maximum NOx Conversion @ 350 C. (%) | Maximum NOx Conversion @ 450 C. (%) | SO$_2$ Oxidation @ 550 C. (%) |
|---|---|---|---|---|---|---|
| 9a  | 0.15 | 61.5 | 87.4 | 75.5 | 100.0 | 12.8 |
| 9b  | 0.20 | 60.5 | 61.5 | 82.4 | 100.0 | 11.7 |
| 9c  | 0.30 | 54.8 | 59.8 | 78.5 | 99.9  | 10.4 |
| 9d  | 0.40 | 41.1 | 52.2 | 64.6 | 90.5  | 10.1 |
| 10a | 0.20 | 70.7 | 82.6 | 79.9 | 94.3  | 11.0 |
| 10b | 0.25 | 53.0 | 50.0 | 69.5 | 100.0 | 7.3  |

The table shows that when molybdenum and phosphorus are added directly to the support (Examples 9a-9d) the Maximum NO$_x$ Conversion initially increases with P loading and passes through an optimum at about 0.2 w % P loading. As expected, the SO$_2$ oxidation monotonically decreases with increasing P loading. Examples 10a and 10b show that adding phosphorus in two separate steps, that is during support prep with additional added during the catalyst prep, is also effective in increasing NO, conversion to an optimum with decreases when too much P is added. Comparison of Examples 8a, 9a, and 10a show that there are some apparent differences in NO, conversion depending on how the phosphorus and/or molybdenum are added.

Example 11

To determine if the enhancement of NO$_x$ conversion and suppression of SO$_2$ oxidation are effected solely by P or are other elements capable of inducing the same improvements, sulfur and silica were tested in the same manner.

Example 11a

A 349.5 g sample of anatase titanium hydrolysate slurry (27.9% solids) is heated to 60° C. via a temperature controlled hot plate and the temperature is maintained throughout the preparation. The pH is adjusted to 4 with a dilute ammonium hydroxide solution. A 20 g portion (as received basis) of strong acid ion-exchange resin (Dowex™ 650C H-form) is weighed out and placed in a buret column. A solution is prepared by dissolving 3.68 g of ammonium heptamolybdate and 0.69 g of ammonium persulfate ((NH$_4$)$_2$S$_2$O$_8$) in 20 ml water, and the solution is added to the slurry via the ion exchange column at a rate of 5 ml/min. After the addition is complete, the pH of the mixture is adjusted to 4 with a dilute ammonium hydroxide solution and allowed to react for 10 min. A dilute solution (1 w % SiO$_2$) of sodium silicate is prepared by adding 1.7 g of Inobond Na-4011 sodium silicate (29.4 w % as SiO$_2$) to 48.4 g of deionized water. The dilute silicate solution is added through the column containing the ion exchange resin to the slurry at a rate of 5 ml/min. After complete addition, the ion exchange resin in the column is rinsed with 10 ml of deionized water added at a rate of 5 ml/min into the titania slurry. The pH is again adjusted to 4 with ammonium hydroxide and allowed to react for 20 min. The mixture is filtered, rinsed with 1.0 liter of deionized water, dried at 105° C., and then calcined at 530° C. for 6 hrs. The targeted loadings are 0.5 w % SiO$_2$, 0.17% S, and 2 w % Mo. 0.9% vanadia is added as described in Example 1.

Example 11b

The catalyst support is prepared as described in Example 11a with the exception that 1.06 g of Inobond Na-4011 sodium silicate (29.4 w % as SiO$_2$) is substituted for the ammonium persulfate in the molybdenum solution. The targeted loadings are 0.8 w % SiO$_2$ and 2 w % Mo. 0.9% vanadia is added as described in Example 1.

Example 11c

The catalyst support is prepared as described in Example 11a with the exception that 0.55 g of 85% phosphoric acid and 0.35 g of ammonium persulfate are added to the molybdenum solution. The target loadings of this product are 0.15 w % P, 0.09% S, 0.5 w % SiO$_2$, and 2 w % Mo. 0.9% vanadia is added as described in Example 1.

The results of the reactor testing are shown in Table 5 below.

TABLE 5

| Example | Modifier and Loading | NOx Conversion at 10 ppm Slip @ 350 C. (%) | NOx Conversion at 10 ppm Slip @ 450 C. (%) | Maximum NOx Conversion @ 350 C. (%) | Maximum NOx Conversion @ 450 C. (%) | SO$_2$ Oxidation @ 550 C. (%) |
|---|---|---|---|---|---|---|
| 11a | 0.17% S | 67.7 | 94.8 | 83.2 | 100.0 | 13.1 |
| 11b | 0.31% SiO2 | 71.2 | 85.8 | 89.4 | 100.0 | 10.4 |
| 11c | 0.15% P & 0.09% S | 23.7 | 27.4 | 65.2 | 81.3 | 11.9 |

Example 11a results surprisingly show that S added in the same molar proportion as 0.15% P also effectively reduces SO$_2$ oxidation. Addition of S in the manner described in Example 11a also seems to improve NO$_x$ conversion. It should be appreciated that addition of sulfur is not restricted by a particular sequential order, amount, and form such as ion exchange unless expressly stated otherwise. It is also surprising that silica has a favorable effect on reducing SO$_2$ oxidation and increasing NO$_x$ conversion when silica is added with molybdenum at a molar equivalent to 0.15 w % P and through the ion exchange column. The example 11a and 11b data demonstrate that P is not the only element that can be used to increase NO$_x$ conversion while reducing SO$_2$ oxidation. Example 11c data show combining sulfur with phosphorus has a detrimental effect on NO$_x$ conversion while still being effective in reducing SO$_2$ oxidation.

Example 12a

A 331.5 g sample of anatase titanium hydrolysate slurry (26.3% solids) is heated to 60° C. via a temperature controlled hot plate, and the temperature is maintained throughout the preparation. The pH is adjusted to 4 with a dilute ammonium hydroxide solution. A dilute solution (1 w % SiO$_2$) of sodium silicate is prepared by adding 5.1 g of Inobond Na-4011 sodium silicate (29.4 w % as SiO$_2$) to 144.9 g of deionized water. A 40 g portion (as received basis) of strong acid ion-exchange resin (Dowex™ 650C H-form) is weighed out and placed in a buret column. The dilute silicate solution is added through a column containing the ion exchange resin to the slurry at a rate of 5 ml/min. The pH is again adjusted to 4 with ammonium hydroxide and allowed to react for 20 min. A second solution is prepared by dissolving 7.36 g of ammonium heptamolybdate in 20 ml water. This solution is added to the slurry via the ion exchange column at a rate of 5 ml/min. After complete addition, the ion exchange resin in the column is rinsed with 20 ml of deionized water added at a rate of 5 ml/min into the titania slurry. The pH of the mixture is adjusted to 4 with a dilute ammonium hydroxide solution and allowed to react for 10 min. The mixture is filtered, rinsed with 1.0 liter of deionized water, dried at 105° C., and then calcined at 530° C. for 6 hrs. The target loadings are 1.5 w % SiO$_2$ and 4 w % Mo.

Example 12b

The catalyst support is prepared as described in Example 12a with the exception that 0.56 g of 85% phosphoric acid is added to the molybdenum solution. The target loadings of this support are 0.15 w % P, 1.5 w % SiO$_2$, and 4 w % Mo.

Example 12c

The catalyst support is prepared as described in Example 12a with the exception that 1.12 g of 85% phosphoric acid is added to the molybdenum solution. The target loadings of this support are 0.3 w % P, 1.5 w % SiO$_2$, and 4 w % Mo.

Example 12d

The catalyst support is prepared as described in Example 12a with the exception that 3.72 g of 85% phosphoric acid is added to the molybdenum solution. The target loadings of this support are 1.0 w % P, 1.5 w % SiO$_2$, and 4 w % Mo.

Example 12e

The catalyst support is prepared as described in Example 12a with the exception that 7.44 g of 85% phosphoric acid is added to the molybdenum solution. The target loadings of this support are 2.0 w % P, 1.5 w % SiO$_2$ and 4 w % Mo. In each case, 0.9 vanadia is added as described in Example 1.

An accelerated DeNO$_x$ conversion test is performed in the following manner. The catalyst is evaluated as a powder without further shaping. A ⅜" quartz reactor holds 0.1 g catalyst supported on glass wool. The feed composition is 1000 ppm of NO, 5% O$_2$, 5% 10H$_2$O. The partial pressure of NH$_3$ is successively increased from 700 ppm to 900 ppm and then finally to 1200 ppm with the balance being N$_2$. NO conversion is measured after steady state is achieved at each NH$_3$ setting while the reactor temperature is maintained at 350° C. and pressure is atmospheric. The reactor effluent is analyzed with an infrared detector to determine NO conversion. The results of the NO$_x$ conversion testing and the SO$_2$ oxidation testing are shown in Table 6 below.

TABLE 6

| Example | Total Phosphorus Loading (%) | NOx Conversion at 350 C. | | | SO$_2$ Oxidation @ 550 C. (%) |
|---|---|---|---|---|---|
| | | 700 ppm NH$_3$ (%) | 900 ppm NH$_3$ (%) | 1200 ppm NH$_3$ (%) | |
| 12a | 0.00 | 58.9 | 67.6 | 69.6 | 11.1 |
| 12b | 0.15 | 56.4 | 75.4 | 78.6 | 9.1 |
| 12c | 0.30 | 65.8 | 78.7 | 84.8 | 10.7 |
| 12d | 1.00 | 67.1 | 77.2 | 82.8 | 5.1 |
| 12e | 2.00 | 49.3 | 57.4 | 72.6 | 4.9 |

The 4% Mo loading catalysts show similar trends as have been observed. The SO$_2$ oxidation rate generally decreases with increasing phosphorus loading, and the NO$_x$ conversion at 350° C. surprisingly goes through a maximum with increasing phosphorus.

Use of the term "metal" as a component of the catalyst shall be understood to have the same meaning as the respective metal oxide as a component of the catalyst unless stated otherwise. For example, "Mo as an oxidant" means the same as "MoO$_3$ as oxidant." Approximating language, as used herein throughout the specification and claims, may be applied to modify any quantitative or qualitative representation that could permissibly vary without resulting in a change in the basic function to which it is related. Accordingly, a value modified by a term such as "about" or numerical ranges is not to be limited to a specified precise value and may include values that differ from the specified value. In at least some instances, the approximating language may correspond to the precision of an instrument for measuring the value. Furthermore, "removing or reducing NO$_x$" may be used in combination with a term, and include a varying amount of NO$_x$ removal and is not to be limited to a specified precise value and may include values that differ from a specified value.

It will be apparent to those skilled in the art that various modifications and variations can be made in the method and system of the present invention without departing from the spirit or scope of the invention. Thus, it is intended that the presently disclosed and/or claimed inventive concept(s) includes modifications and variations that are within the scope of the appended claims and their equivalents.

While the presently disclosed and/or claimed inventive concept(s) has been described in detail in connection with only a limited number of aspects, it should be understood that the presently disclosed and/or claimed inventive concept(s) is not limited to such disclosed aspects. Rather, the presently disclosed and/or claimed inventive concept(s) can be modified to incorporate any number of variations, alterations, substitutions, or equivalent arrangements not heretofore described but which are commensurate with the scope of the claims. Additionally, while various embodiments of the presently disclosed and/or claimed inventive concept(s) have been described, it is to be understood that aspects of the presently disclosed and/or claimed inventive concept(s) may include only some of the described embodiments. Accordingly, the presently disclosed and/or claimed inventive concept(s) is not to be seen as limited by the foregoing description but is only limited by the scope of the appended claims.

What is claimed is:

1. A method of making a catalyst support material comprising:
    a. providing an anatase titania slurry;
    b. providing an amount of phosphate to the anatase titania slurry; and
    c. combining the anatase titania slurry with i) low molecular weight form of silica and ii) a source of Mo to form a TiO$_2$—MoO$_3$—SiO$_2$ mixture, wherein
    the low molecular weight form of silica comprises a member selected from a group consisting of forms of silica having a volume weighted median size of less than 4 nm and average molecular weight of less than 44,000, and combinations thereof.

2. The method of claim 1, further comprising providing the phosphate after providing i) the low molecular weight form of silica and ii) a source of Mo.

3. A catalyst support material comprising:
    from about 86% to about 94% weight anatase titanium dioxide; from about 0.1% to about 10% weight MoO$_3$; from about 0.01% to about 2.5% P; and from about 0.1% to about 10% weight SiO$_2$ in a low molecular weight form;

wherein the low molecular weight form of $SiO_2$ comprises a member selected from a group consisting of forms of silica having a volume weighted median size of less than 4 nm and average molecular weight of less than 44,000, and combinations thereof.

4. The catalyst support material of claim 3 comprising:
from about 0.2% to about 5% weight the $SiO_2$ in a low molecular weight form; from about 0.2% to about 5% weight $MoO_3$; and from about 0.01% to about 2.5% P; and wherein the from about 86% to about 94% weight anatase titanium dioxide comprises anatase titania particles.

5. A catalyst support material comprising:
anatase titanium dioxide; a primary promoter comprising molybdenum oxide and phosphorus oxide; and a volatility inhibitor comprising a low molecular weight form of silica;
wherein the mole ratio of phosphorus to molybdenum is in a range of from about 0.2:1 to about 4:1; and
wherein the low molecular weight form of silica comprises a member selected from a group consisting of forms of silica having a volume weighted median size of less than 4 nm and average molecular weight of less than 44,000, and combinations thereof.

6. A method of making a catalyst support material comprising:
a) providing anatase titania slurry;
b) providing an amount of phosphate to the anatase titania slurry; and
c) combining the anatase titania slurry with
i) volatility inhibitor comprising a low molecular weight form of silica; and ii) primary promoter comprising molybdenum oxide to form a $TiO_2$—$MoO_3$—$SiO_2$ mixture;
wherein the low molecular weight form of silica comprises a member selected from a group consisting of forms of silica having a volume weighted median size of less than 4 nm and average molecular weight of less than 44,000, and combinations thereof.

7. The method of claim 6, further comprising providing the phosphate before providing i) the volatility inhibitor and ii) the primary promoter.

8. A method comprising:
contacting a nitrogen oxide-containing gas or liquid for a time sufficient to reduce the level of $NO_x$ in the nitrogen oxide-containing gas or liquid with a catalyst comprising:
from about 86% to about 94% weight anatase titanium dioxide; from about 0.1% to about 10% weight $MoO_3$; from about 0.5% to about 3% weight $V_2O_5$; from about 0.01% to about 2.5% weight P; and from about 0.1% to about 10% weight $SiO_2$ in a low molecular weight form, wherein the low molecular weight form of $SiO_2$ comprises a member selected from the group consisting of forms of silica having a volume weighted median size of less than 4 nm and average molecular weight of less than 44,000, and combinations thereof.

* * * * *